United States Patent Office

3,507,803
Patented Apr. 21, 1970

3,507,803
EUROPIUM ACTIVATED GADOLINIUM OR YTTRIUM BORATE-VANADATE
Willem Lambertus Wanmaker, Johannes Wilhelmus ter Vrught, and Johannes Godefridus Verlijsdonk, Emmasingel, Eindhoven, Netherlands, assignors, by mesne assignments, to U.S. Philips Corporation, New York, N.Y., a corporation of Delaware
No Drawing. Filed July 27, 1967, Ser. No. 656,337
Claims priority, application Netherlands, July 29, 1966, 6610689
Int. Cl. C09k *1/44, 1/66*
U.S. Cl. 252—301.4                           2 Claims

ABSTRACT OF THE DISCLOSURE

A red luminescent phosphor formed of a trivalent europium activated gadolinium or yttrium borate in which part of the borate is substituted by vanadium.

---

This invention relates to a luminescent screen for use in cathode ray tubes, or in combination with radiation sources, for example high-pressure mercury vapour discharge lamps in which ultra-violet radiation is generated, the screen having a red luminescent component consisting of a compound activated with trivalent europium. Furthermore the invention relates to a method of preparing such a red luminescent component, and to the red luminescent component itself.

Of late red luminescent components containing europium as an activator have found a wide field of interest, because very different compounds with europium as an activator often show a strong luminescence in the red part of the spectrum, with little radiation being emitted in other parts. Moreover, the energy emitted by such luminescent compounds in the red part of the spectrum is concentrated in a very narrow wavelength range.

One of the most prominent compounds for the above uses is yttrium vanadate activated with trivalent europium. This may be used both in cathode ray tubes, particularly for reproduction of coloured television pictures, and in combination with high-pressure mercury vapour discharge lamps. In the latter case the substance serves to improve the colour of the radiation emitted by the discharge, the radiation having, as is known, a shortage of red light. The yttrium vanadate with europium converts a large part of the energy in the ultra-violet part of the mercury spectrum into red radiation which, together with the blue radiation of the discharge, yields a substantially white light. The yttrium vanadate activated with europium is especially suitable for use in colour television picture tubes, because it provides a deep red colour and has a reasonably high conversion efficiency.

One of the important properties of the europium-containing yttrium vanadate for use in combination with high-pressure mercury vapour discharge lamps is furthermore that it has a very good temperature dependence. This means that the luminous efficiency at high temperatures (300° to 500° C.) differs little from that at room temperature. The latter property can also play a part in colour television picture tubes when the load of the screen is increased to a very high value.

It has of course been tried to produce substances with still better properties by modifications of the lattice containing the trivalent europium. The invention, too, relates to such an improvement but, as will be explained hereinafter, it provides the additional advantage that the preparation of the red luminescent component is much simpler.

A luminescent screen according to the invention comprises a red luminescent component activated with trivalent europium and is characterized in that said component satisfies the formula $$Me_{(1-y)}(RO_4)_{(1-x)}(BO_3)_x Eu_y^{+++}$$

in which formula Me represents at least one of the elements from the group of gadolinium and yttrium, and R is the element vanadium, or vanadium which is partly replaced by at least one of the elements from the group of phosphorus and arsenic, and in which $$0.02 \leq x \leq 0.9$$
$$0.01 \leq y \leq 0.12$$

If $x$ is chosen to be less than 0.02 substantially no effect of the addition of borate will be obtained; if $x$ is chosen to be more than 0.9 substantially pure borate is formed that no longer luminesces red, but orange and in addition has a poor efficiency.

The quantity of europium indicated by the index $y$, is chosen to be between the above-mentioned limits because good luminous efficiencies are then obtained. Preferably, $x$ is chosen to be between 0.03 and 0.6 and $y$ between 0.02 and 0.06 because the highest efficiencies are obtained at these values.

The red luminescent component of the screen according to the invention differs from the above-mentioned known vanadates in that the element boron is always present in the lattice where it replaces part of the vanadium. If necessary, another part of the vanadium may be replaced by at least one of the elements from the group of phosphorus and arsenic. However, if this is the case the condition $$0 \leq \frac{P+As}{V} \leq 8$$

must always be satisfied. This condition shows that phosphorus and arsenic may be absent. If the ratio $$\frac{P+As}{V}$$

is chosen to be higher than 8 the efficiency of the luminescent substance will decrease and the colour will shift to orange which is less desirable.

Gadolinium and yttrium may be used in any ratio in the luminescent substances according to the above formula without appreciable changes in properties.

The partial replacement of vanadium by phosphorus or arsenic gives a slight luminous decline during operation of the luminescent screen.

The luminous efficiency of compounds according to the invention is higher than that of europium-activated yttrium vandate. In general 4 to 10% more light is emitted at the area of the maximum in the red part of the spectrum. This maximum lies at approximately 619 nm. both for the compounds according to the invention, and for the yttrium vanadate.

Also the temperature dependence of the red luminescent component in a screen according to the invention is usually better than that of the vanadate.

A very important advantage already described above is that the preparation of the red luminescent component according to the invention is considerably simpler than that of the europium-activated yttrium vanadate and that in addition it gives a whiter substance.

As is known, such a vanadate is obtained by heating at high temperatures a mixture containing yttrium compounds, vanadium compounds and europium compounds. For example, the oxides of yttrium and vanadium or carbonates or vanadates may be used. The europium is almost always added as europium oxide. It has been found that during heating, which must be effected at temperatures between 800° and 1200° C., a grey coloured product is always obtained. It has been found in investigations that this grey colour must be ascribed to free vanadium pentoxide. Such a grey product is of course neither usable in cathode ray tubes, nor in combination with high-pressure mercury vapour discharge lamps. The grey colour in itself is not only unpleasant but it also causes loss of light. Moreover, the excitation may change free vanadium oxide, under the operating conditions of the cathode ray tubes or the radiation sources, into products in which the vanadium has a valency of less than 5. The products which are then obtained are even greyer than the vanadium oxide itself and thus cause an extra loss of light. In order to check this disadvantage it has already been proposed to wash the reaction product which is obtained after the above-mentioned heating, with lye, for example, sodium hydroxide solution. As a result of this, free vanadium oxide is removed and the grey colour disappears. The colour of the product obtained after washing, however, is not fully white, but yellow. This yellow colour is also disadvantageous for use in cathode ray tubes and in combination with high-pressure mercury vapour discharge lamps. With the latter, blue radiation is absorbed, and hence the total efficiency decreases. This decrease of the blue light possibly emitted by other phosphors also occurs in cathode ray tubes. This, however, is not the greatest disadvantage; more disadvantageous is the shift in colour which the viewer observes in watching a coloured picture when white light from exterior sources is incident on the screen. In fact, the yellow coloured vanadate reflects the yellow radiation of this incident light stronger than the other colours. Hence the impression of the light emitted by the vanadate will shift to orange.

An important advantage of the red luminescent component of a luminescent screen according to the invention is that during preparation, which does not essentially differ from the preparation of the vanadates, a white coloured product is obtained immediately after heating. Hence, washing, for example with sodium hydroxide solution, becomes superfluous. In addition there is no trouble of colour shifts when the product is used in cathode ray tubes and no absorption of blue radiation.

The use of boric acid as a flux in preparing luminescent substances has been known for a long time. In the present invention, however, the boric acid is incorporated in the lattice. This appears, for example, from the fact that a product coloured grey by vanadium oxide is indeed obtained if more boric acid is added than is necesary to meet the above-mentioned formula. The boron then apparently displaces the vanadium from the crystal lattice.

From a comparison of the temperature dependence of the red luminescent component according to the invention and the temperature dependence of yttrium vanadate on the one hand and yttrium borate on the other, it appears that the red luminescent component according to the invention is not a mixture of yttrium vanadate and yttrium borate. The spectral distribution of the luminescence light is also equal to that of yttrium vanadate and not to the sum of the spectral distribution of yttrium vanadate and yttrium borate. The remarkable fact presents itself, however, that the X-ray diffraction picture of a red luminescent component according to the invention does show the lines of the vanadate and the borate.

The invention will now be explained with reference to a number of examples and tables.

EXAMPLE 1

A mixture of 3.71 gms. $Y_{1.90}Eu_{0.10}O_3$
2.62 gms. $NH_4VO_3$ is heated in air at a temperature of 400° C. for two hours. The reaction product is homogenised and, if required, pulverised, after which it is again heated in air at 1200° C. for two hours. The resultant product is pulverised and is then ready for use.

EXAMPLE 2

A mixture of 3.71 gms. $Y_{1.90}Eu_{0.10}O_3$
1.69 gms. $NH_4VO_3$
1.90 gms. $(NH_4)HPO_4$
0.20 gms. $H_3BO_3$ is heated in air at a temperature of approximately 400° C. for two hours. The reaction product is pulverised and homogenised and then again heated in air at 1200° C. for two hours. The resultant product is pulverised and is then ready for use.

EXAMPLE 3

A mixture of 3.71 gms. $Y_{1.90}Eu_{0.10}O_3$
1.35 gms. $NH_4VO_3$
2.28 gms. $(NH_4)HPO_4$
0.20 gms. $H_3BO_3$ is treated in exactly the same way as indicated for the mixture of Example 2.

With the substances prepared according to the above examples luminescent screens were made with which tests were carried out in order to determine the properties. The following results were achieved.

A substance according to Example 1 carries the formula:

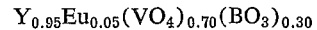
$$Y_{0.95}Eu_{0.05}(VO_4)_{0.70}(BO_3)_{0.30}$$

Under excitation with ultra violet radiation having a wavelength of 253.7 nm. a luminous efficiency of 148 was measured at room temperature with respect to a standard sample. Upon heating the luminescent screen at 400° C. and 500° C. a luminous efficiency was measured of 133% and 77%, respectively. The efficiency was 5.1% on excitation with electrons.

The whiteness of the substance was determined by exposing it to daylight and then determining the percentage of reflection in the blue and the green-yellow part of the spectrum. The higher this reflection, the whiter the appearance of the substance. The green-yellow reflection was 99% and the blue reflection 94% for the substance of Example 1.

For comparison it is stated that an unwashed europium-activated yttrium vanadate has a green-yellow reflection of approximately 75% and a blue reflection of approximately 20%.

A substance prepared according to Example 2 carries the formula

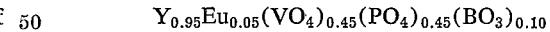
$$Y_{0.95}Eu_{0.05}(VO_4)_{0.45}(PO_4)_{0.45}(BO_3)_{0.10}$$

This substance was measured in the same way as described above for the substance of Example 1. The following results were then obtained:

Luminous efficiency on excitation with radiation of 253.7 nm.:
 at room temperature 143%
 at 400° C. 170%
 at 500° 153%

An efficiency of 3.5% was measured on excitation with electrons.
 Green-yellow reflection 99%
 Blue reflection 94%.

A substance prepared according to Example 3 carries the following formula:

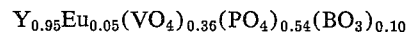
$$Y_{0.95}Eu_{0.05}(VO_4)_{0.36}(PO_4)_{0.54}(BO_3)_{0.10}$$

This substance yielded the following measured results:

The luminous efficiency on excitation with radiation of 253.7 nm. was:
 at room temperature 132%
 at 400° C. 166%
 at 500° C. 162%

An efficiency of 3.4% was measured on excitation with electrons.
Green-yellow reflection 94%
Blue reflection 90%.

A substance having the composition $$Y_{0.95}Eu_{0.05}(VO_4)_{0.15}(PO_4)_{0.75}(BO_3)_{0.10}$$

was also measured.

The following measured results were obtained:

Luminous efficiency on excitation with 253.7 nm.:
 at room temperature 134%
 at 400° C. 170%
 at 500° C. 153%

An efficiency of 3.1% was measured on excitation with electrons.
Green-yellow reflection 95%
Blue reflection 90%.

A substance having the composition $$Y_{0.95}Eu_{0.05}(VO_4)_{0.45}(AsO_4)_{0.45}(BO_3)_{0.10}$$

was also measured.

This substance yielded the following measured results:

Luminous efficiency on excitation with radiation of 253.7 nm.
 at room temperature 149%
 at 400° C. 168%
 at 500° C. 152%
Green-yellow reflection 96%
Blue reflection 86%
Efficiency on excitation with electrons 3.6%.

What is claimed is:
1. A red luminescent composition consisting essentially of a trivalent europium activated fired reaction product corresponding to the formula:

$$Me_{(1-y)}(RO_4)_{(1-x)}(BO_3)_x Eu_y^{+++}$$

wherein Me is at least one element selected from the group consisting of gadolinium and yttrium, R is the element vanadium or mixtures of vanadium with at least one element selected from the group consisting of phosphorous and arsenic and wherein $$0.02 \leq x \leq 0.9,$$
$$0.01 \leq y \leq 0.12 \text{ and}$$

the quantities of vanadium, phosphorous and aresenic are determined by the relationship $$0 \leq \frac{P+As}{V} \leq 8$$

2. The red luminescent composition of claim 1 wherein $$0.03 \leq x \leq 0.6 \text{ and}$$
$$0.02 \leq y \leq 0.06$$

References Cited

UNITED STATES PATENTS 3,417,027   12/1968   Wanmaker et al. ____ 252—301.4

FOREIGN PATENTS 1,022,399   3/1966   Great Britain.
1,464,976   11/1966   France.

HELEN M. McCARTHY, Primary Examiner

R. D. EDMONDS, Assistant Examiner

PO-1050
(5/69)

UNITED STATES PATENT OFFICE
CERTIFICATE OF CORRECTION

Patent No. 3,507,803 (PHN 1783) Dated April 21, 1970

Inventor(s) WILLEM LAMBERTUS WANMAKER ET AL

It is certified that error appears in the above-identified patent and that said Letters Patent are hereby corrected as shown below:

Column 3, after line 70, add the following:-- 0.59 gms $H_3BO_3$ --.

Signed and sealed this 9th day of February 1971.

(SEAL)
Attest:

Edward M. Fletcher, Jr.
Attesting Officer

WILLIAM E. SCHUYLER, JR.
Commissioner of Patents